Nov. 19, 1968 R. MONTABERT 3,411,592
PERCUSSION APPARATUS
Filed Jan. 25, 1968 5 Sheets-Sheet 1
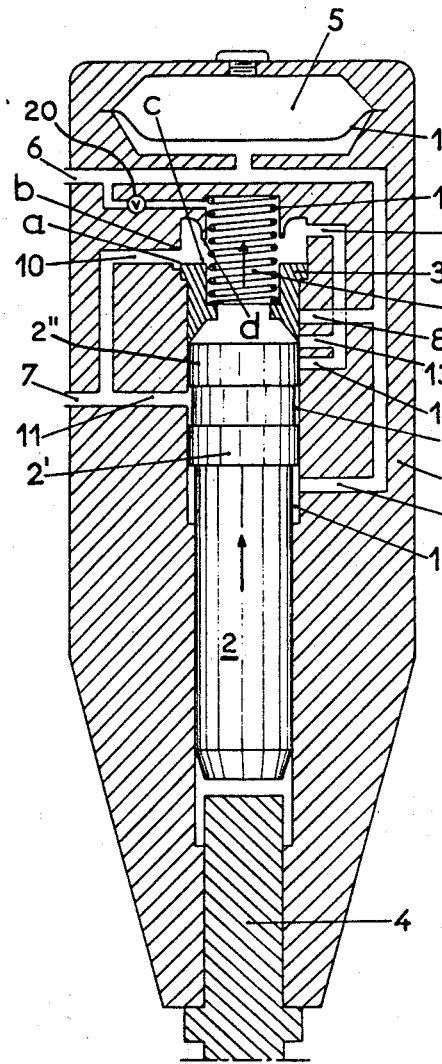
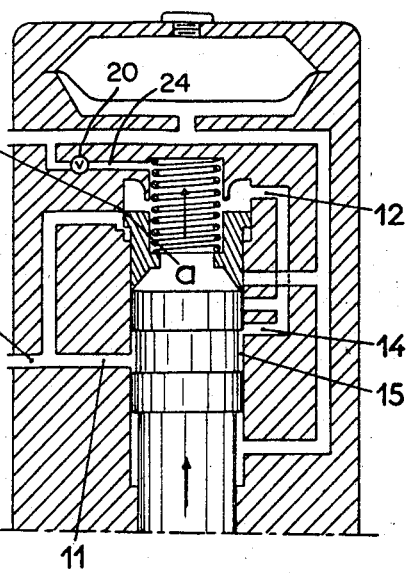
Roger Montabert
INVENTOR.
BY Karl F. Ross
ATTORNEY

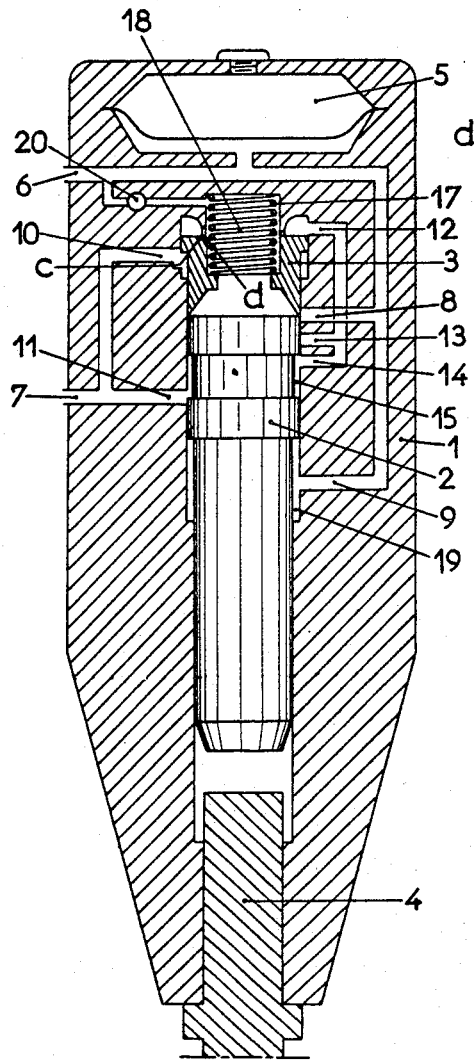
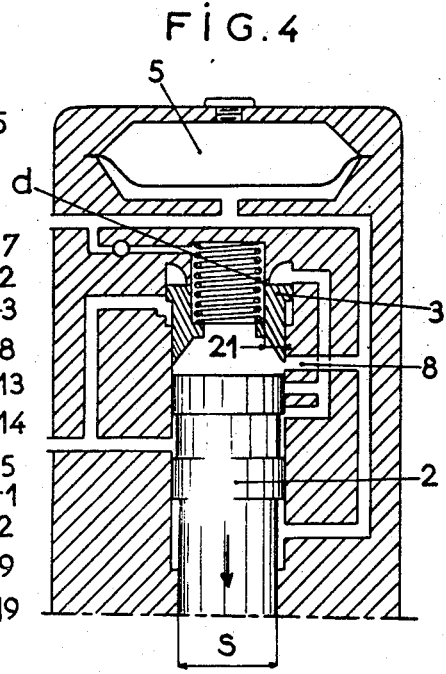

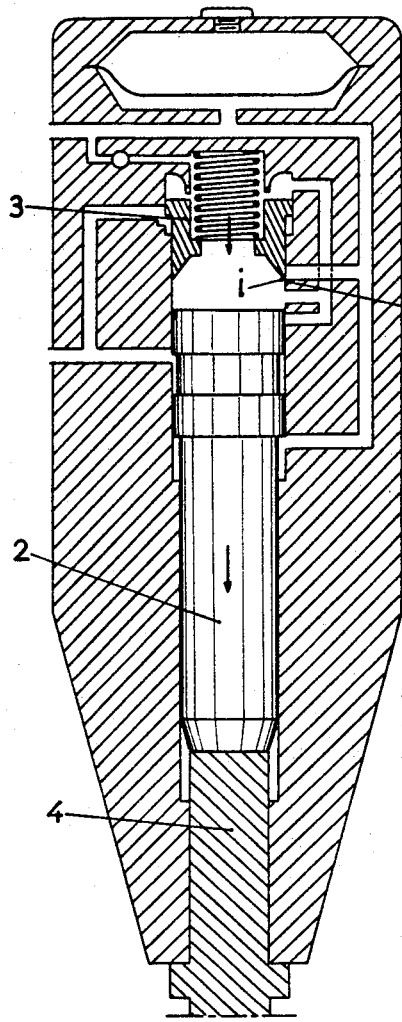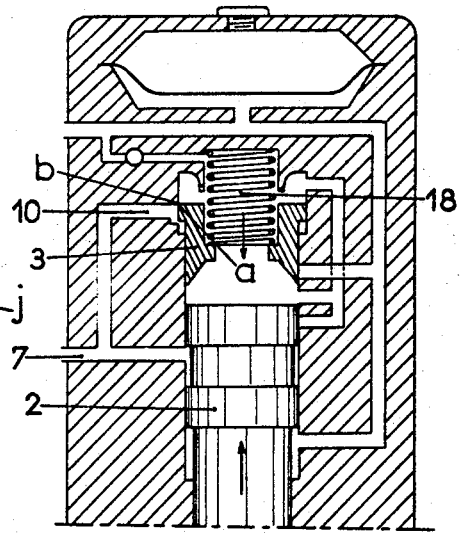

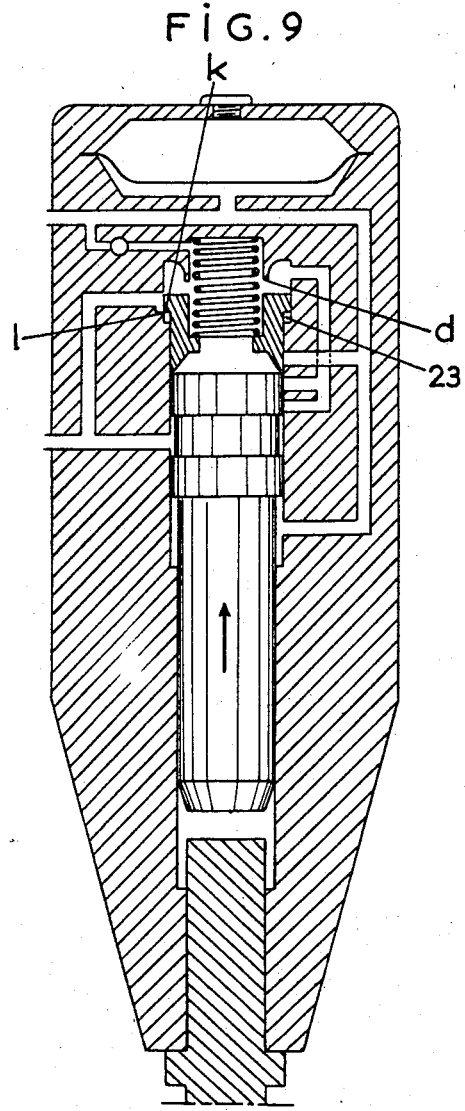

United States Patent Office 3,411,592
Patented Nov. 19, 1968

3,411,592
PERCUSSION APPARATUS
Roger Montabert, 41–43 Rue Bataille,
Lyons, France
Continuation-in-part of application Ser. No. 521,036,
Jan. 17, 1966. This application Jan. 25, 1968, Ser.
No. 707,349
Claims priority, application France, Jan. 28, 1965,
45,558
8 Claims. (Cl. 173—137)

ABSTRACT OF THE DISCLOSURE

The piston (2) of a hydraulically operated percussion implement moves jointly with a juxtaposed distributor (3) in a cylinder bore to block the admission of operating fluid into a cylinder portion (18) behind the large-area rear face of the piston head from a high-pressure port (8) until both the piston and the distributor have reached a fully retracted position (FIG. 3). Thereafter, a reduced forward pressure is exerted upon the piston head through a valve-controlled conduit (24) to separate the piston from the distributor just enough to unblock the said high-pressure port (FIG. 5) whereupon the piston is propelled at high speed toward a tool bit (4), finally unblocking a channel (13) for the release of the distributor from its retracted position whereupon the high-pressure port (8) is again blocked (FIG. 7) and the piston is once more retracted under fluid pressure acting continuously upon its small-area forward face.

Figure 5:
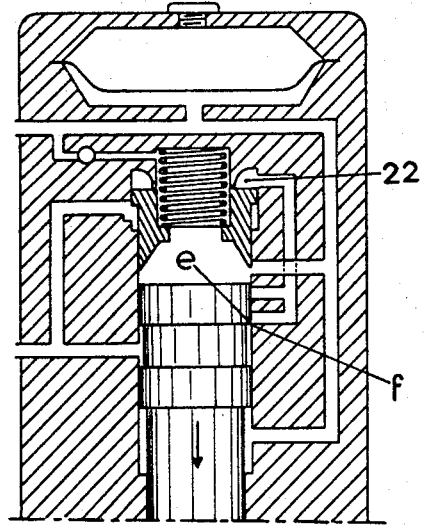

This application is a continuation-in-part of my copending application Ser. No. 521,036 filed Jan. 17, 1966, now abandoned.

My present invention relates to a device adapted to execute a succession of percussion strokes on a tool such as a bit, a pick, a borer or the like, with a view to disaggregating a concrete mass, a rock or like material, or else to performing operations giving rise to impacts, such as riveting, hammering or ramming.

There exist various devices of this type, generally termed pneumatic hammers. Such devices exhibit a number of serious drawbacks: they are always very noisy and consequently their operation sometimes results in a momentary deafening of the operator while also disturbing considerably the inhabitants of property near which they are used.

The present invention aims at eliminating this drawback and providing a percussion-type implement whose operating noise is considerably reduced while its power efficiency is simultaneously increased. A more specific object is to provide an implement of this character adapted to utilize a noncompressible operating fluid, i.e. a liquid under pressure, as an operating fluid in lieu of compressed air or some other gas.

In an apparatus according to my invention, the piston of a fluid-operated percussion implement moves jointly with a juxtaposed distributor in a cylinder bore to block the admission of operating fluid into a cylinder portion behind the large-area rear face of the piston head from a high-pressure port until both the piston and the distributor have reached a fully retracted position. Thereafter, advantageously by exertion of a reduced forward pressure upon the piston head through a valve-controlled conduit, the piston is separated from the distributor just enough to unblock the said high-pressure port whereupon the piston is propelled at high speed toward a tool bit. The distributor is then released from its retracted position, preferably by fluid from a channel unblocked by the advancing piston, whereupon the high-pressure port is again blocked and the piston is once more retracted under fluid pressure acting continuously upon its small-area forward face.

The separation of the distributor from the piston head, which is of the same width or diameter as the latter, is conveniently brought about by a differential valve responsive to an increase in inlet pressure occurring in the terminal position of the retracted piston. In order to produce such rise in inlet pressure at the end of the retraction stroke if the operating fluid is a hydraulic liquid, the high-pressure branch of the system may be connected to an expansion chamber whose mobile wall element (e.g. a diaphragm) acts against an air cushion or other elastic restoring means.

The present invention will be readily understood and its advantages and further features will appear upon a reading of the following description, reference being made to the accompanying diagrammatic drawing illustrating by way of example and in a non-limiting sense a preferred embodiment thereof. In the drawing:

FIGS. 1 to 9 are longitudinal sectional views of the apparatus during the successive stages of its cycle of operation.

In all the figures, 1 designates the body of the apparatus having a longitudinal bore which forms a cylindrical chamber wherein a double-acting piston 2 reciprocates. This piston, whose head includes two enlarged sections 2', 2'' separated by a narrower section or waist 15, periodically strikes a tool bit 4 in the open end of the bore under the action of a liquid under pressure (e.g. oil). The latter is stored in an expansion chamber 5 subdivided into a gas-filled (e.g. air-filled) upper part and a liquid-filled lower part by a diaphragm 16 which yields upwardly upon the return of the liquid into the chamber. The liquid fed into the apparatus at an inlet 6 is delivered into and out of the expansion chamber and into and out of the sections of the cylindrical chamber through channels including an outlet 7 and ports 8–14 opening into the cylinder bore formed within the body 1 and controlled by a distributor 3 slidingly carried in the upper section of the cylindrical chamber and subjected to the pressure of a spring 17 in a space 18 representing the top of the cylindrical bore. A passage 24 connecting inlet 6 with space 18 contains a conventional (e.g. ball-type) valve 20 responsive to a predetermined pressure differential thereacross.

A complete cycle, starting from the inoperative position illustrated in FIG. 1, can be described as follows:

Operating fluid under high pressure enters the port 6 and fills the lower part of the storage chamber 5 in which the diaphragm 16 is thus repressed. The pressure increases then in the port 8, blocked by distributor 3, and in the port 9 which leads an annular chamber 19 surrounding the reduced stem of the piston 2 underneath the head of the latter. The piston is thus urged upwardly inside the bore of cylinder 1 together with the distributor 3, against the force of spring 17, to unblock the port 14 which thereby becomes connected to outlet 7. The fluid contained in the upper cylinder space 18 is discharged into the outlet 7 through the branch channel 10 until the outer upper edge $a$ of the distributor 3 engages the upper edge $b$ of the entrance end of the channel 10, as illustrated in FIG. 2, whereupon the fluid exits through conduits 12, 14, 11 and 7 by way of the waist 15 of the piston head 2', 2'' which is now raised into registry with channel 14.

The upward or rearward movement of the piston and distributor, away from the tool 4, continues until the calibrated biasing spring 17 has been compressed so as to occupy the position illustrated in FIG. 3 in which the inner upper edge $c$ of the distributor 3 comes to rest on an annular rib $d$, projecting its space 18, to obstruct the channel 12. The pressure below the piston head reaches then a predetermined value which is a function of the gas pressure in the upper part of chamber 5 and depends on the calibration of the counteracting spring 17 and on the cross-sectional area of the annular chamber 19 bounded by the narrow front face of the piston head $2'$, $2''$. The apparatus may now be considered as set for the initiation of the working or forward stroke, the pressure prevailing at this instant in high-pressure branch 6, 8, 9, 19 being termed the minimum setting pressure.

If the downwardly directed working stroke of the piston is not then immediately initiated, the pressure continues to rise in the channel system 6, 8, 9, 19 as a result of the cessation of the upward motion of the piston 2. Thus, the gas cushion in expansion chamber 5 is loaded until the pressure therein reaches a predetermined value. The start of the working stroke is produced by such an increase of the pressure inside the spring chamber 18 that the resultant of the forces applied to the piston 2 is reversed. This increase in pressure inside the space 18 eventually opens the valve 20 which is representative of any flow-control means operative upon or in response to the elevation of piston 2 into the top position illustrated in FIG. 3. By this means any intermediate pressure, lying between a high or inlet pressure $pa$ and a low or outlet pressure $pe$ is developed in space 18 after the latter has been cut off from the outlet 7 by contact between the edge $c$ of the rear surface of the distributor 3 and the annular rib $d$ which forms a seat for compression spring 17 and bounds an annular recess 22 (FIG. 5) communicating with passage 12. Thus, the ball valve 20 must be calibrated to respond to a pressure higher than the minimum setting pressure.

Figure 6:
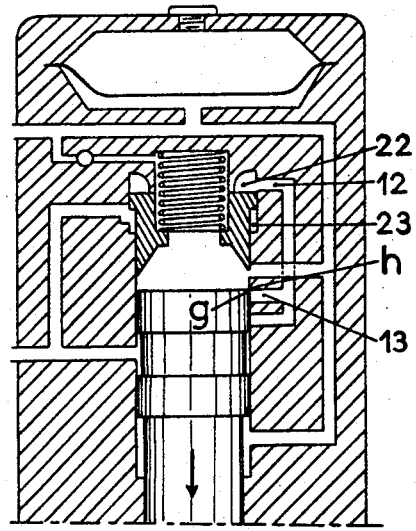

It will be noted that the distributor 3 and the piston head $2'$, $2''$ have the same diameter and that, in the fully retracted position of FIG. 3, they jointly block the high-pressure port 8. When the valve 20 opens to start the piston on its forward stroke, the reduced fluid pressure from the restricted conduit 24 acts on the piston 2 which is thus separated from the distributor 3 so that the full hydraulic force equal to the product of the high pressure $pa$ times the area of the large rear face of the piston becomes effective. The hydraulic fluid is then admitted directly through the port 8 from the inlet 6 so that the piston 2 moves in the forward direction, i.e. downwardly as illustrated in FIG. 4, at an accelerated pace, the expansion chamber 5 being partly drained at this stage. The distributor 3 remains in contact with rib $d$ under the action of the hydraulic force exerted on the annular area 21 of this distributor by reason of the difference between the pressure $pa$ and $pe$ effective above and below the distributor, this difference predominating over the force exerted by the spring 17. The lower edge $c$ of the upper section 21 of the head of the piston 2 then engages, as illustrated in FIG. 5, the lower edge $f$ of the port 14 so that the recess 22 is now cut off the low-pressure branch 7, 10, 11. As the piston continues its working stroke, its upper most edge $g$ clears, as illustrated in FIG. 6, the upper ridge $h$ of the port 13 branching off the channel 12. The recess 22 is thus brought into communication with the source of high-pressure fluid through the channels 13 and 12. This reverses the resultant force exerted on the distributor 3 which starts on its downward movement at an increased speed to follow the piston, being subjected, on the one hand, to the action of the spring 17 and, on the other hand, to the hydraulic force due to the difference between the inlet pressure $pa$ and the outlet pressure $pe$ prevailing in the annular space 23 located underneath the enlarged head of the distributor 3. When, as illustrated in FIG. 7, the lower edge $i$ of the distributor 3 registers with the lower edge $j$ of the port 8 to obstruct the latter, the admission of high-pressure fluid into the upper chamber 18 is cut off and the piston 2 continues its forward stroke, under the action of its inertia, until it reaches the bit 4. On the other hand, the distributor 3 also continues its downward motion, as illustrated in FIG. 8, so that its upper edge $a$ again clears the upper edge $b$ of the channel 10 which thereupon vents the upper chamber 18 by connecting it with the low-pressure or exhaust side of the fluid circuit through outlet 7. The piston 2 then executes its return stroke; as the distributor continues to move down (FIGS. 8 and 9), the lower edge $k$ of its enlarged head drops below the lower edge $e$ of the channel 10 so as to confine the non-compressible fluid inside the space 23. This arrests the distributor 3 until the piston 2 re-engages this distributor and drives it upwardly. The cycle of operation is thus at an end and a further cycle begins.

Obviously, the invention is by no means limited to the sole embodiment disclosed by way of example but covers, on the contrary, all the modifications thereof falling within the scope of the appended claims.

I claim:

1. A percussion implement comprising a body formed with a bore having an open front end and a closed rear end; a tool received in said bore and projecting through said front end from said body; a piston slidable in said bore behind said tool for striking same in a forward position, said piston having a head with a small-area front face confronting said tool and a large-area rear face remote from said tool, said body being provided with a channel system including an inlet and an outlet for a high-pressure operating fluid, a first port communicating with said inlet and opening into said bore forwardly of said head for exerting a rearwardly acting fluid pressure upon said front face, and a second port communicating with said inlet and opening into said bore rearwardly of said head for exerting a forwardly acting fluid pressure upon said rear face; a distributor slidable in said bore adjacent said rear face, said distributor being coextensive in width with said head; biasing means tending to maintain said distributor in contact with said piston, said distributor being of such axial length as to block said second port in any except a fully retracted position of the distributor, said second port remaining blocked by said head in a fully retracted position of said piston; and starting means effective in the fully retracted position of said piston and said distributor for separating said piston sufficiently from said distributor to unblock said second port whereby said forwardly acting fluid pressure accelerates said piston toward said tool.

2. An implement as defined in claim 1 wherein said distributor has a rear surface abutting said closed rear end in its fully retracted position, said channel system including a fluid space behind said rear surface and a passage for connecting said fluid space with said outlet at the beginning and with said inlet at the end of a forward stroke of said piston whereby said distributor is advanced from its retracted position to block said second port upon the piston reaching its forward position.

3. An implement as defined in claim 2 wherein said distributor has a flange forming said rear surface and extending radially outwardly to subject the distributor to a forwardly acting differential pressure upon connection of said fluid space with said inlet.

4. An implement as defined in claim 2 wherein said biasing means comprises a compression spring, said closed end being formed with an annular rib engaging said rear surface in the fully retracted position of said distributor and forming a seat for said spring.

5. An implement as defined in claim 1 wherein said starting means includes a restricted conduit leading from said inlet to said bore and terminating at the closed end thereof, said conduit being provided with normally closed valve means arranged to open in the fully retracted position of said piston.

6. In implement as defined in claim 5 wherein said valve means comprises a differential valve responsive to an increase in fluid pressure at said inlet upon arrival of said piston in said fully retracted position.

7. An implement as defined in claim 6 wherein said fluid is a hydraulic liquid, further comprising an expansion chamber connected with said channel system near said inlet for building up the fluid pressure acting on said differential valve upon the stopping of said piston in its fully retracted position.

8. An implement as defined in claim 7 wherein said expansion chamber has a mobile wall element bearing upon a gas cushion.

References Cited

UNITED STATES PATENTS

| | | | |
|---|---|---|---|
| 626,497 | 6/1899 | Meissner | 173—134 |
| 703,758 | 7/1902 | Birkenstock | 173—137 |
| 1,247,080 | 11/1917 | Christiansen | 173—134 X |
| 1,771,238 | 7/1930 | Walsh | 91—341 |
| 2,164,970 | 7/1939 | Van Sittert et al. | 173—134 |
| 3,322,210 | 5/1967 | Arndt | 173—134 |

DAVID H. BROWN, *Primary Examiner*.